(12) United States Patent
Talwar et al.

(10) Patent No.: US 9,026,055 B2
(45) Date of Patent: May 5, 2015

(54) POWER CONTROL TECHNIQUE TO MITIGATE INTERFERENCE IN MULTI-TIER NETWORKS

(75) Inventors: Shilpa Talwar, Los Altos, CA (US);
Shu-Ping Yeh, Mountain View, CA (US); Kerstin Johnsson, Palo Alto, CA (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1197 days.

(21) Appl. No.: 12/913,700

(22) Filed: Oct. 27, 2010

(65) Prior Publication Data
US 2012/0108249 A1 May 3, 2012

(51) Int. Cl.
| H04B 1/00 | (2006.01) |
|---|---|
| H04B 15/00 | (2006.01) |
| H04W 52/24 | (2009.01) |
| H04W 72/04 | (2009.01) |
| H04W 16/32 | (2009.01) |
| H04W 28/24 | (2009.01) |
| H04W 52/14 | (2009.01) |
| H04W 52/26 | (2009.01) |
| H04W 84/04 | (2009.01) |

(52) U.S. Cl.
CPC ............ *H04W 52/244* (2013.01); *H04W 16/32* (2013.01); *H04W 28/24* (2013.01); *H04W 52/143* (2013.01); *H04W 52/265* (2013.01); *H04W 72/0473* (2013.01); *H04W 84/045* (2013.01)

(58) Field of Classification Search
CPC .......................... H04W 52/243; H04W 72/082
USPC ........... 455/63.1, 114.2, 278.1, 296, 524, 526
See application file for complete search history.

(56) References Cited

U.S. PATENT DOCUMENTS

| 7,484,008 B1 * | 1/2009 | Gelvin et al. ................. 709/249 |
|---|---|---|
| 2004/0095907 A1 | 5/2004 | Agee et al. |
| 2008/0309490 A1 | 12/2008 | Honkanen et al. |
| 2009/0082052 A1 | 3/2009 | Bhushan et al. |

OTHER PUBLICATIONS

Rongzhen Yang, et al, "Uplink Open Loop Power Control Recommendations for IEEE 802.16m Amendment," IEEE C802.16m-0546, Mar. 2009.

International Search Report and Written Opinion received for PCT Patent Application No. PCT/US2011/056570, mailed Mar. 16, 2012, 8pgs.

* cited by examiner

*Primary Examiner* — Eugene Yun
(74) *Attorney, Agent, or Firm* — Kacvinsky Daisak Bluni PLLC

(57) ABSTRACT

A method and apparatus to manage interference in a multi-cellular network is disclosed. This approach uses downlink power control to allow a serving femto access point of a plurality of femto access points to transmit signals at a first power level to ensure a quality of service level of a service provided to a first plurality of mobile stations served by the plurality of femto access points. This approach also uses the downlink power control to adjust a power level of the signals transmitted by a serving femto access point of the plurality of the femto access points to manage interference caused by the serving femto access point on a second plurality of mobile stations served by one or more macro base stations.

16 Claims, 5 Drawing Sheets

POWER CONTROL TECHNIQUE TO MITIGATE INTERFERENCE IN MULTI-TIER NETWORKS

BACKGROUND

A multi-tier network may include two or more networks, which may be overlaid to enhance network coverage and quality of communication. A multi-tier cellular network may, for example, include an overlay of macro base-station network and femtocell access point network to provide improved coverage to mobile nodes provisioned within each cell. In a cellular network scenario, rapid development in broadband access technologies has led to a faster deployment of broadband services in homes, offices and enterprises, and cities and towns. To enable wireless broadband access, the service providers have deployed macro base stations (MBS) to provide network coverage to the mobile nodes provisioned within the coverage area of macro base-stations. However, the macro base-stations alone may not provide good quality voice and data services and good network coverage within the coverage area of the macro base-stations.

Also, there is a substantial increase in the number of mobile users wanting to access both voice and data services with a good network coverage from wherever they are positioned. Especially, many times the mobile network coverage may be poor within homes and small office buildings that may cause frustration to mobile users. To improve the quality of mobile or cellular coverage, the service providers are planning to deploy or have deployed huge number of femtocell access points (FAP) in homes and small offices and such other places. An overlay of networks such as the macro base-station network and FAP network may provide enhanced performance, for example, in terms of providing better network coverage. Unfortunately, such overlaid networks also cause interference among the devices of the overlaid networks, which may cause degradation in the quality of service provided to the mobile nodes or mobile stations. Typically, power control techniques are used to mitigate the effect of interference and such power control techniques are applied by the macro base-station in single-tier cellular networks. In the multi-tier networks, as the density of FAPs increases, having power control technique applied at the macro base-station may not provide efficient interference mitigation caused by the FAPs.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
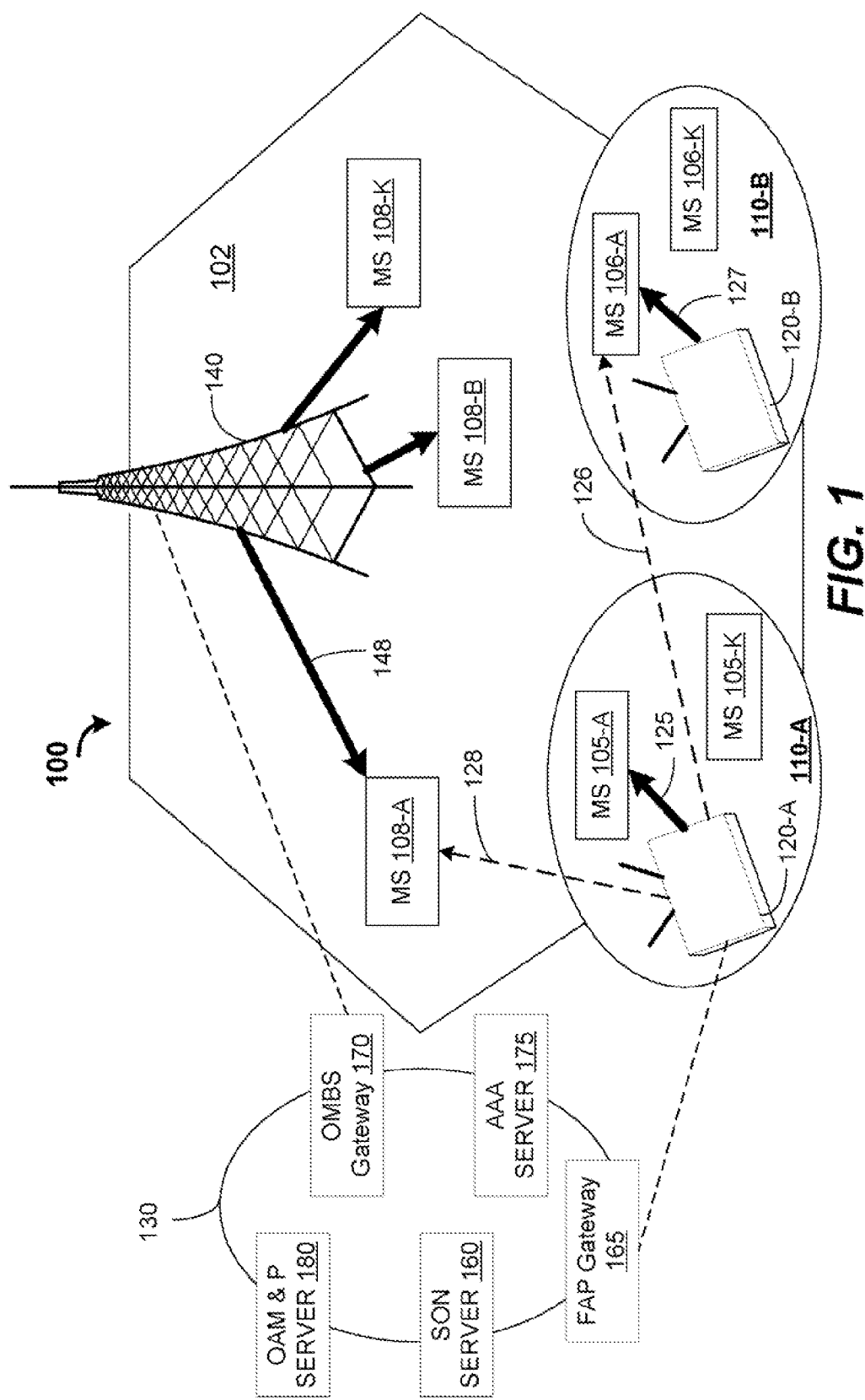
FIG. 1 illustrates a network environment 100.

The following description describes a power control technique applied at the FAP, which is used to mitigate interference in multi-tier networks. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Typically, power control is applied at a first network device such as a macro-base station in a cellular network, but the application of power control in a co-channel multi-tier network provides for interference mitigation by managing power control at a second network device such as femto access points (FAP) overlaid on the first network devices. In one embodiment, a downlink power control technique may be used to manage the interference caused by a second network on a first network, while optimizing capacity of the second network. In one embodiment, the second network may include devices such as the femto access points (FAPs) and femto-users served by the femto access points and the first network may include devices such as the macro-base stations and macro-users (mobile stations, for example) served by the first network device such as the macro base-station. In one embodiment, the power control technique may be performed at the FAPs to minimize interference caused by the FAPs (in the second network) on the macro-users (in the first network). The power control techniques described herein are described with reference to the femto-cell overlay network wherein femto-cells and macro-cells are deployed in the same geographical area. However, the power control techniques described here may be applied in other types of multi-tier networks as well.

Under co-channel operation where the femto access points (FAP) transmit over the same frequency band as macro base stations (MBS), FAPs may cause severe interference on the macro-network and drive macro-users into outage. In order to mitigate this issue, a power back-off at the FAPs may be performed. Controlling power at the FAPs may reduce outdoor outage and alleviate macro-user performance degradation due to interference from femto-cell overlay. Also, different power control solutions may be provided for data and controls signals. For example, for data signals, the objective may be to maximize overall system capacity, while for control signals the objective may be to ensure reliability of decoding important control information.

In one embodiment, power control techniques may be applied at the FAPs to mitigate interference caused on the macro network by FAPs. The power control techniques applied at the FAPs may comprise a FAP transmitting (1) at Fixed Power level; (2) at a power level determined based on a quality of service (QoS) value provided for the mobile stations served by FAP (referred to as "Femto-QoS power control", hereafter); and (3) at a power level determined based on a quality of service (QoS) value provided for the mobile stations served by the macro base-station (referred to as "Macro-QoS power control", hereafter).

In one embodiment, the FAPs may use a fixed power level technique if the femto and macro networks do not share a same carrier frequency. In one embodiment, the FAPs may transmit information units or frames at a fixed power level (P0), which may be lower than a maximum available power level (Pmax). In one embodiment, the fixed power level (P0) may be determined based on the density of the FAPs. In other embodiment, the fixed power value (P0) may be provided by a central network entity such as a self-organizing network (SON) server, or may be determined by the FAPs based on a self-organizing algorithm. In yet other embodiment, the value of P0 may be X % less than the Pmax value. In one embodiment, the fixed power level (P0) may be different for control portions and data portions of a frame, which may be transmitted by the FAPs.

In one embodiment, if the femto and macro networks share the same carrier frequency one of the adaptive techniques such as femto QOS power control or macro QOS power control technique may be used. If the FAP uses the Femto-QoS power level technique, the FAP may transmit at a power level Pt(FAP), which may be sufficient to support femto-users fulfilling given QoS constraints, even for a mobile node having a weakest signal quality. In one embodiment, the FAP may transmit at a power level Pt(FAP), which may be above an interference level caused by the macro base-station (MBS). In one embodiment, for control signals, the femto-user QoS may be set to a minimum value in order to minimize interference caused to the mobile stations ('macro-users') served by the macro base-stations.

If the FAP uses the Macro-QoS power level technique, the FAP may transmit at a power level Pt(FAP) such that limited interference is caused to macro-users. In one embodiment, the Macro-QoS power level technique may be sensitive to presence of the macro-users in the neighborhood of FAP, and the FAP may lower the transmit power level Pt(FAP) if it causes significant interference to the macro-users. In one embodiment, such an approach may protect the macro-user.

In one embodiment, the power control techniques described below may be combined with other interference mitigation techniques to further improve the performance of the multi-tier network. In one embodiment, the power control techniques described below may be used with frequency planning schemes such as assigning femto-free zones to protect macro-users. In other embodiment, the power control techniques described below may be combined with a low-duty cycle operation of the FAPs to further reduce the interference. In one embodiment, such an approach may be applied to adjust the transmit power of data and control channels. In one embodiment, the following description describes power control techniques to mitigate interference caused by a FAP on one or more macro-users served by a macro-base station. However, the power techniques that are described below may be applicable in scenarios in which more than one FAP (in the second network) may cause interference on one or more macro users served by one or more macro-base stations (in a first network).

An embodiment of a network environment 100 in which power control techniques may be supported by femtocell access points (FAPs) is illustrated in FIG. 1. In one embodiment, the network environment 100 may include a macro-cell 102, femto-cells 110-A and 110-B, femtocell access points 120-A and 120-B, a wireless network 130, and a macro base station MBS 140. In other embodiments, the network environment 100 may include multiple macro-cells and/or macro base stations. In one embodiment, the wireless network 130 may include a self-organizing network server (SON) 160, FAP gateway 165, a MBS gateway 170, an AAA server 175, and an operation, administration, maintenance, and provisioning (OAM&P) server 180. In one embodiment, the FAP 120-A and FAP 120-B may be coupled to the FAP gateway 165 via a core network using modems. The core network and the modems are not shown for brevity.

In one embodiment, the MBS 140 may serve mobile stations MS 108-A, MS 108-B, and 108-K. In one embodiment, the MBS 140 may be referred to as a "serving MBS" (SMBS) with reference to the mobile stations MS 108-A, MS 108-B, and 108-K. In one embodiment, the NIBS 140 may serve the MS 108-A by forwarding the information units from other mobile stations to the MS 108-A and from the MS 108-A to the other mobile stations such as MS 108-B, MS-108K, MS 105 and MS 106, for example. In one embodiment, the arrow mark 148 indicates that the MBS 140 is the serving MBS for the MS 108-A.

In one embodiment, the femto-cells 110-A and 110-B may, respectively, include one or more mobile stations MS 105-A and 105-K and MS 106-A and 106-K. In one embodiment, the FAP 120-A may be referred to as a "serving FAP" (SFAP) with reference to the mobile station MS 105-A, for example. In one embodiment, the FAP 120-A may serve the MS 105-A by forwarding the information units from other mobile stations to the MS 105-A and from the MS 105-A to the other mobile stations such as MS 106 and MS 108. In one embodiment, the arrow mark 125 indicates that the FAP 120-A is the serving FAP for the MS 105-A.

However, the serving FAP 120-A while serving the MS 105-A and 105-K provisioned within the femtocell 110-A may also cause interference to the MS 108-A (or other macro-users in the macro network), which may be served by the MBS 140 and to MS 106-A and MS 106-K served by the FAP 120-B. In one embodiment, the interference caused by the femtocell 110-A to the MS 108-A and MS 106-A may be, respectively, represented by the dotted lines 128 and 126. Under co-channel operation in which FAP 120-A transmits over the same frequency band as the MBS 140, FAP 120-A may cause severe interference to the macro-network and drive the macro-users such as MS 108-A, MS 108-B, and 108-K into outage. For example, the interference caused by FAP 120-A on the macro-users such as MS 108-A, MS 108-B, and MS 108-K may result in a 6-15 dB loss in signal to interference plus noise ratio (SINR) with an increasing density of FAPs such as the FAP 120-A transmitting at 10 dB transmit power. In addition, the FAP 120-A provisioned among high density FAPs may cause interference to femto-users such as MS 106-A and MS 106-K served by the FAP 120-B in the neighboring femto cell 110-B. The interference caused by the FAP 120-A to the MS 106-A and MS 106-K may be about 10 dB loss in SINR.

In one embodiment, in order to mitigate the interference caused by the FAP 120-A, a power back-off may be performed FAP 120-A. In one embodiment, performing power back-off at FAP 120-A may reduce and alleviate macro-user performance degradation due to interference from the femto-cell overlay. In one embodiment, the down-link power control techniques may be used to manage interference caused by the FAP 120-A on the macro-network while optimizing the capacity of the femto-network. In one embodiment, different power control techniques may be applied to data signals and control signals. In one embodiment, the power control techniques applied to data signals may maximize the overall system capacity and that of control signals may ensure reliability of decoding control information.

Based on a deployment scenario, one or more power control techniques may be available to minimize interference caused by the FAP 120-A. Also, different power control techniques may be used for control and data signals and the preferred power control technique may also depend on co-channel versus different channel overlay network and density of FAPs.

Figure 2:
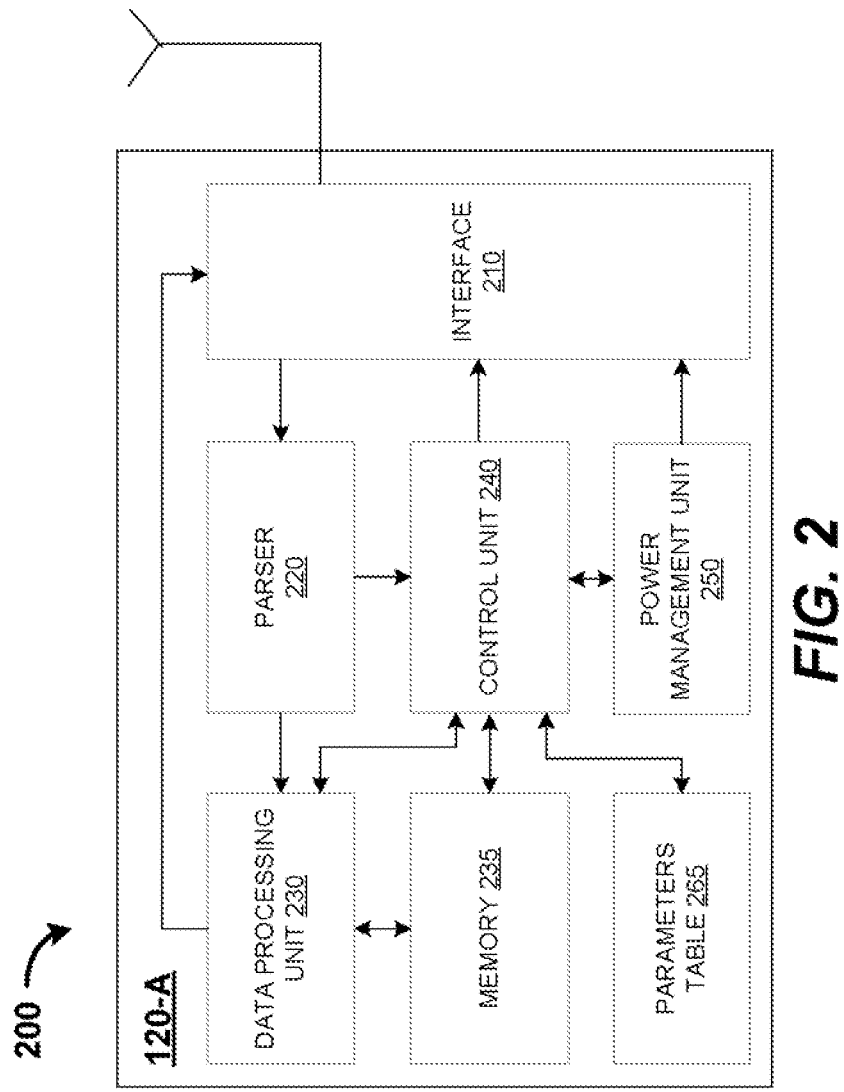
FIG. 2 illustrates a block diagram of the femtocell access points (FAP), which may support power control techniques in accordance with one embodiment.

An embodiment of a femto-cell access point (FAP 120-A), which may support power control techniques is illustrated in FIG. 2. In one embodiment, the FAP 120-A may comprise an interface 210, parser 220, data processing unit 230, memory 235, control unit 240, power management unit 250, and a parameters table 265.

In one embodiment, the interface 210 may receive information units from other devices in the network 100 and transfer the information units from the FAP 120-A to the other devices in the network 100. In one embodiment, the interface 210 may provide physical, electrical, protocol interface between the FAP 120-A and the other devices in the network 100. In one embodiment, the interface 210 may support wireless and wired connectivity as well.

In one embodiment, the parser 220 may receive the information units from the interface 210 and view the content of the information units and may forward the information units to one of the data processing unit 230 or the control unit 240. In one embodiment, if the information units comprise data to be processed then the parser 220 may forward such data units to the data processing unit 230 and if the information units comprise control information than the parser 220 may send such control units to the control unit 240.

In one embodiment, the data processing unit 230 may receive data units from the parser 220 and process the data before saving such data into the memory 235. In one embodiment, the data processing unit 230 may process data, voice, video and such other information units. In one embodiment, the data processing unit 230 may also provide a signal to the control unit 240 to inform that the data processing task is complete.

In one embodiment, the control unit 240 may receive control information from the network server such as the SON server 160 or may generate control information based on the contents of the information units received from the parser 220. In one embodiment, the control unit 240 may receive QoS parameters such as femto QoS and macro QoS values and may store such values in the parameters table 265. In one embodiment, the control unit 240 may choose a preferred mechanism to control power based on decision parameters such as co-channel or channel overlay network type, density of femto cells, or other interference mitigation techniques that may be already used.

In one embodiment, the control unit 240 may send a selection signal to the power management unit 250. In one embodiment, the selection signal may include selection values that indicate the preferred mechanism selected by the control unit 240. In one embodiment, the control unit 240 may send the selection signal to the power management unit 250 in response to making a selection of the preferred mechanism. In one embodiment, the selection signal may include a field in which selection values such as 0X01 for the fixed power mode, 0X02 for a femto QoS power control mode and 0X03 for a macro QoS power control mode may be stored.

In one embodiment, the power management unit 250 may receive the selection signal from the control unit 240 and may determine the power control technique that may be used. In one embodiment, the power management unit 250 may choose the power control technique based on the selection values embedded in the selection signal.

Figure 3:
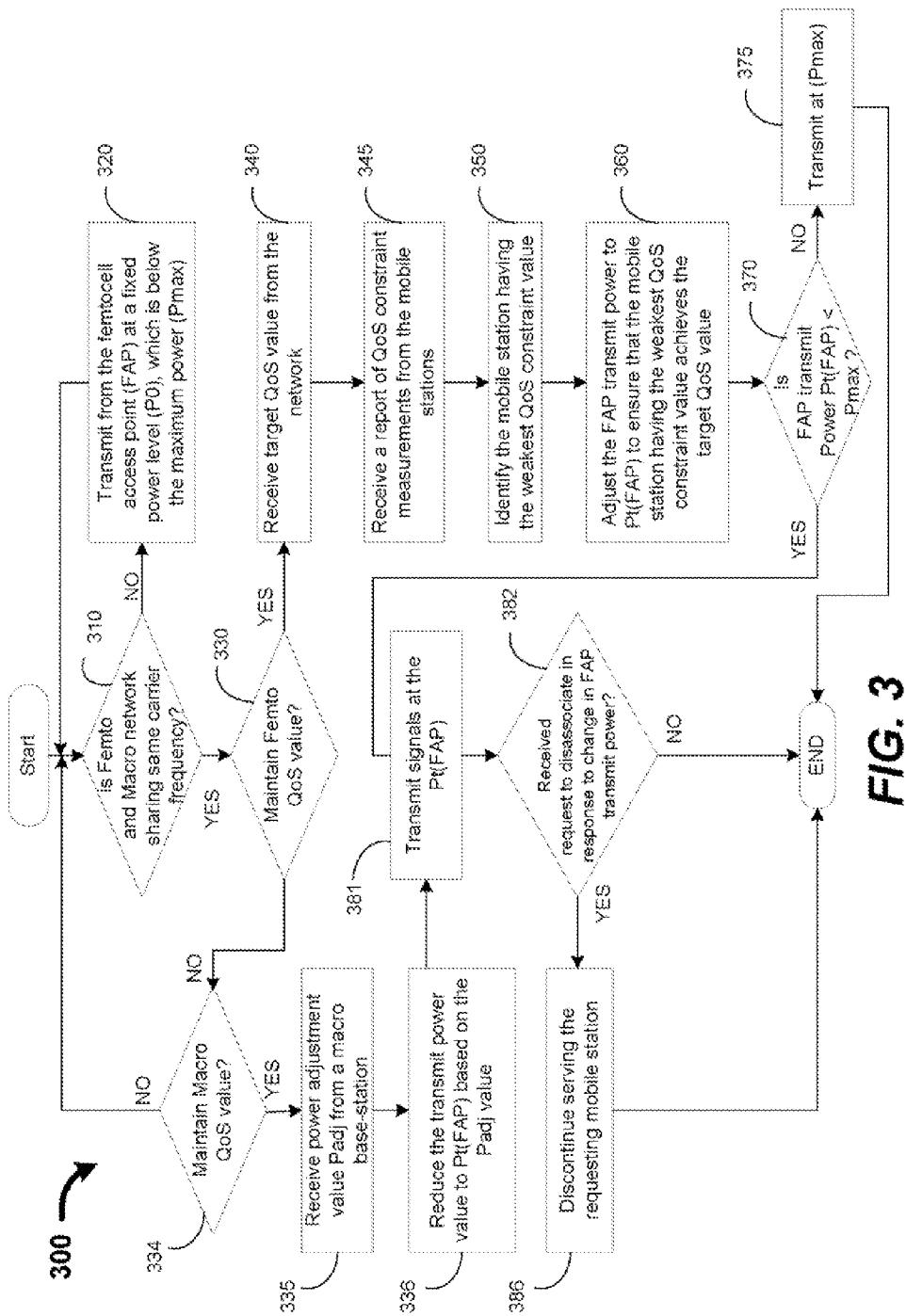
FIG. 3 is a flow-chart 300, which may illustrate the operation of the femtocell access point (FAP) to support power control techniques applied at the FAP in accordance with one embodiment.

An embodiment of an operation of the FAP 120-A that may perform power control techniques is illustrated in flow-chart of FIG. 3. In block 310, the control unit 240 may check if the FAP 120-A and the MBS 140 are transmitting over the same carrier frequency and control passes to block 320 if both the FAP 120-A and the MBS 140 are not transmitting over the same carrier frequency and control passes to block 330 otherwise. In one embodiment, the control unit 240 may embed 0X01 into the selected values field if both the FAP 120-A and the MBS 140 transmit over the different carrier frequencies.

In block 320, the power management unit 250 may enable the FAP 120-A to transmit at a fixed power level (P0). In one embodiment, the fixed power level (P0) may be less than the maximum power level (P Max). In one embodiment, the fixed power level P0 and P Max may be a function of density of FAPs, and may be provided by a central network entity such as the SON server 160, or may be determined by the FAP 120-A based on a self-organizing algorithm. In one embodiment, the power level P0 may be different for control and data portions of the frame.

In block 330, the control unit 240 may check if the femto QOS power control technique may be used and control passes to block 340 if femto QOS power control technique is to be used and to block 334 otherwise. In one embodiment, the control unit 240 may determine the control technique to be used based on the user input or based on the priority level set for maintaining QOS of femto-user and QOS of macro user or based on a threshold of interference level experienced by the macro users or any other such parameters.

In block 334, the control unit 240 may check if the macro QOS power control technique may be used and control passes to block 335 if the macro QOS power control technique is to be used and to block 310 otherwise.

In block 335, the power management unit 250 may receive power adjustment value Padj from the macro base station 140. In one embodiment, the power adjustment value Padj may be determined such that lowering the power value Pt(FAP) of the signal(s) to be transmitted by the power adjustment value Padj may mitigate the interference caused by the FAP 120-A on the macro users, for example, MS 108-A. In one embodiment, the power management unit 250 may determine a power value at which the signals are to be transmitted on a downlink channel such that the interference caused by the FAP 120-A on the mobile stations MS 108 served by the MBS 140 is below an admissible interference value. In one embodiment, lowering the power value Pt(FAP) of the signal(s) to be transmitted, over the downlink channel, by the power adjustment value Padj may enable the interference to be maintained below an allowable interference value. In one embodiment, the allowable interference value may be provided by the control unit based on at least some of the parameter values provided by other network devices such as SON server 160 or the OMA&P server 180.

In block 336, the power management unit 250 may reduce the transmit power by the power adjustment value Padj and may cause the FAP 120-A to transmit signals at Pt(FAP). In one embodiment, if the signals are transmitted at a power value Pt(FAP) (adjusted based on the power adjustment value Padj) the interference caused by the FAP 120-A on the macro network i.e., MS 108-A, MS 108-B, MS 108-K, and such other devices may be limited to a minimum value.

In one embodiment, lowering the transmit power value to Pt(FAP) may result in an interference power, which may be less than X decibels compared to (I_macro+noise) power. In other embodiment, lowering the transmit power value to Pnew may result in a decrease in the interference power by a fixed power K, which may be sufficient to limit the interference caused by the FAP 120-A on the macro network.

In block 340, control unit 240 may receive target QoS value such as the signal to interference plus noise ratio (SINR) measurements from the network devices such as this SON server 160 or retrieve the target QoS value from the parameters table 265. In one embodiment, the control unit 240 may provide the target QOS value to the power management unit 250.

In block 345, the control unit 240 may receive a report of QoS constraint values such as SINR measurement values from the mobile stations MS 105, which are being served by the FAP 120-A. In one embodiment, the control unit 240 may provide the QOS constraint measurements values to the power management unit 250.

In block 350, the power management unit 250 may identify the mobile station, which may have the weakest QOS constraint value. In one embodiment, the power management unit 250 may identify the mobile station which has the weakest QOS constraint value by comparing the QOS measurement values received from the mobile stations with the target QOS value.

In block 360, the power management unit 250 may determine the transmit power value Pt (FAP) to ensure that the mobile station having the weakest QOS constraint value achieves the target QOS value. In one embodiment, the power management unit 250 may change the transmit power value Pt (FAP) and for each transmit power value (e.g., Pt1(FAP), Pt2(FAP), . . . Ptn(FAP)), the power management unit 250 may determine the QOS value and compare such QOS value with the target QOS value to ensure that the mobile station having the weakest QOS constraint value achieves the target QOS value. In one embodiment, the transmit power value Ptk(FAP) may satisfy the transmit power requirements for a mobile station having the weakest QoS constraint value to achieve the target QoS value.

In block 370, the power management unit 250 may determine if the transmit power value Ptk(FAP) that satisfies the mobile station having the weakest QOS constraint value to achieve the target QOS value is less than PMax and control passes to block 375 if the Ptk(FAP) is greater than PMax and to block 381 otherwise.

In block 375, the power management unit 250 may allow the FAP 120-A to transmit at a transmit power level P(max). In block 381, the power management unit 250 may allow the signals or packets to be transmitted at Pt(FAP).

In block 382, the control unit 240 may determine if a request to disassociate from the FAP 120-A is received from one or mobile stations that are being served by the FAP 120-A in response to transmitting at Pt(FAP). Control passes to end block if the request is not received and to block 386 if the request to disassociate is received. Power adjustment at FAP may cause mobile stations associated with other MBSs such as MBS 140 or other FAPs such as FAP 120-B to disconnect from the serving base stations and send requests to associate with the FAP 120-A. In one embodiment, the FAP 120-A may accept the requests and then admit the requesting mobile stations using handover/admission procedures. In one embodiment, the mobile stations may request to disassociate from the FAP 120-A or the MBS 140 if the signal to interference noise ratio (SINR) decreases below a given threshold to push the mobile stations into outage. In one embodiment, the mobile stations may continue to be associated with the FAP 120-A or the MBS 140 if the SINR is above the given threshold value. In other embodiment, the mobile stations may disassociate from the serving FAP or MBS if there exists a FAP or MBS, which may provide the best received signal power. Such an approach may allow the mobile stations to be associated with one of the FAP or the MBS, which may provide a substantially good SINR value to enable best signal quality.

In block 386, the control unit 240 may cause the FAP 120-A to discontinue serving the mobile stations that have requested for disconnection.

Figure 4:
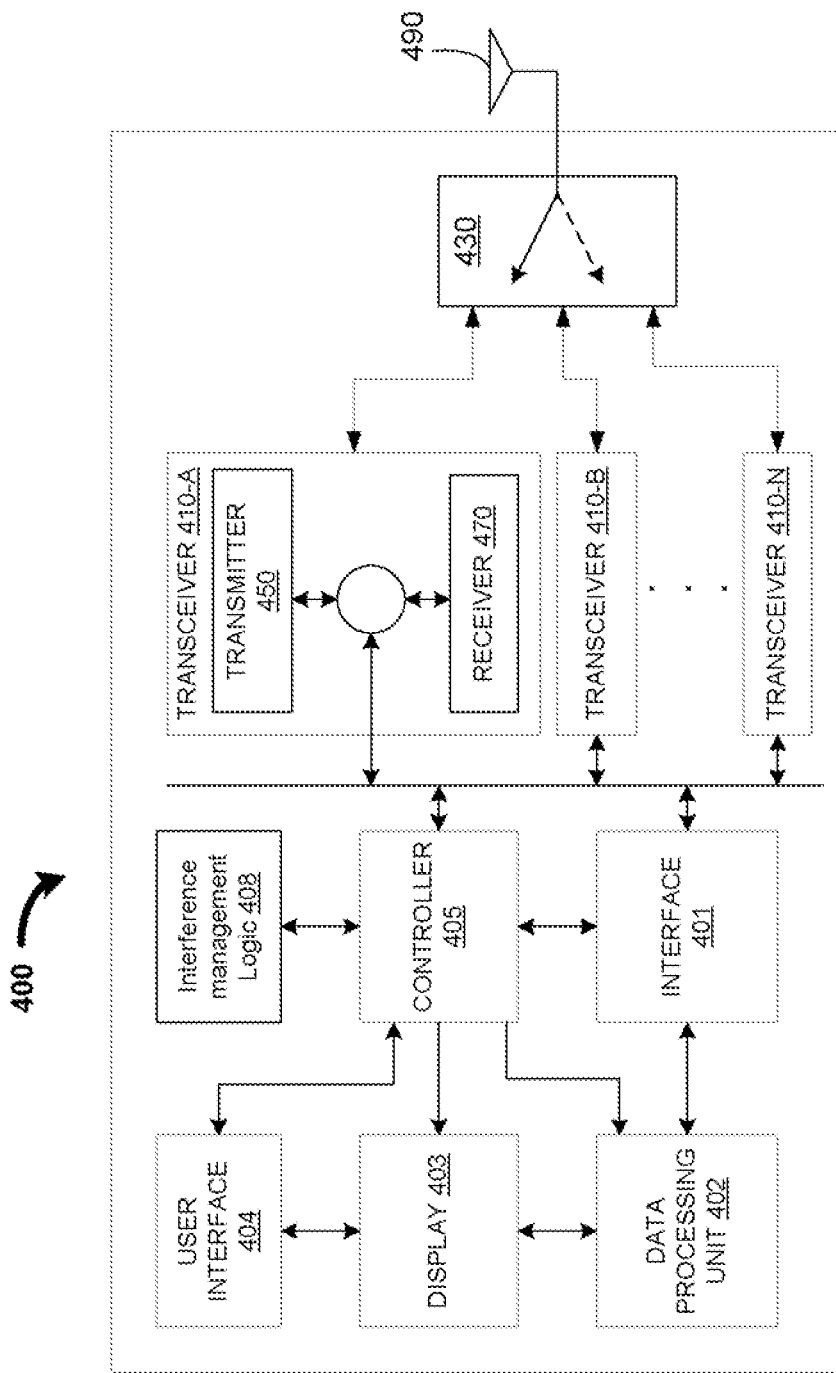
FIG. 4 illustrates a block diagram 400 of the mobile node (MN) or mobile station (MS), which may support power control techniques in accordance with one embodiment.

An embodiment of the MS 400 which may support power control techniques is illustrated in FIG. 4. In one embodiment, the MS 400 may represent one of the mobile stations such as MS 105, MS 106, or MS 108. In one embodiment, the MS 400 may comprise an interface 401, a data processing unit 402, to display 403, a user interface 404, a controller 405, a interference management logic 408, one or more transceivers 410-A to 410-N, a switch for 430, and an antenna 490. However, the MS 400 may, in other embodiments, comprise a single transceiver, multiple antennas, and such other similar variations. In one embodiment, the MS 400 may be a provisioned as a portion of a network interface card and in other apparatus/system such as a computer platform, a laptop computer, a mobile internet device, handhelds, smart phones, and televisions.

In one embodiment, the interface 401 may couple the MS 400 to one of the FAP 120-A or MBS 140 provisioned in the environment 100. In one embodiment, the interface 401 may provide physical, electrical, and protocol interface between the MS 400 and with other apparatus coupled to the MS 400.

In one embodiment, the transceiver 410-A may comprise a transmitter 450 and a receiver 470. In one embodiment, each of the transceiver 410-B to 410-N may comprise a transmitter and receiver, which may be similar to the transmitter 450 and the receiver 470 of the transmitter 410-A. In one embodiment, while receiving the signals from the antenna 490, the receiver 470 of the transceivers 410-A may receive the signal through a switch 430. In one embodiment, while transmitting the signals, the transmitter 450 of the transceiver 410-A may provide the radio signal to the antenna 490 through the switch 430. In one embodiment, the switch 430 may couple the transmitters 450 and/or the receiver 470 to the antenna 490 on a time sharing basis, for example, in response to an event such as a selection control signal of the controller 405. In other embodiment, the switch 430 may be provided with intelligence to couple an appropriate transmitter 410 to the antenna 490.

In one embodiment, the data processing unit 402 may receive data units from the interface 401 and process the data before storing the data either in a memory or render the data on the display 403. In one embodiment, the data processing unit 402 may operate under the control of the controller 405. In one embodiment, the user interface 404 may be used by a user to provide inputs based on which the controller 405 may initiate one or more actions.

In one embodiment, in addition to controlling the other modules in the MS 400, the controller 405 may control the modulation and demodulation techniques selected by the transceivers 410. In one embodiment, the controller 405 may control communication parameters such as the transmission rate, bit error rate, and other such parameters. In one embodiment, the controller 405 may determine if the mobile station MS 400 is served by one of the FAPs or the MBS and then may provide control to the interference management logic 408.

In one embodiment, the interference management logic 408 may receive a signal from the controller 405 that may indicate if the MS 400 is served by the FAP or MBS. In one embodiment, the interference management logic 408 may receive a first value (for example, logic one) if the MS 400 is served by the FAP or a second value (for example, logic zero) if the MS 400 is served by the MBS. In one embodiment, the interference management logic 408 may determine the QoS constraint values for the MS 400 and may provide the QoS constraint values to the FAP 120-A if the MS 400 is served by the FAP 120-A. In one embodiment, the MS 400 may send a signal either to disassociate from the serving FAP 120-A or to continue communicating via the serving FAP 120-A in response to receiving an indication of a decrease in the transmit power value from the serving FAP 120-A.

In one embodiment, the interference management logic 408 may determine interference values (I1, I2, I3, . . . Ip) representing interferences caused by one or more FAPs on the macro user MS 400, which is served by the MBS 140. In one embodiment, the interference management logic 408 may identify the FAP, which may cause a maximum or strong interference. In one embodiment, the interference management logic 408 may retrieve a macro interference value stored in a memory or provided by the controller 405, which may represent the total interference of one or more MBSs such as the MBS 140 plus the noise value (Imacro+noise). In one embodiment, the interference management logic 408 may compare the interference values (I1, I2, I3, . . . Ip) with the macro interference plus the noise value and if the INx of any FAP 120 is greater than the macro interference plus the noise value by 'X' decibels, then the interference management logic 408 may mark that particular FAP 120 as the one causing a strong interference.

In one embodiment, the interference management logic 408 may determine that the interference value (for example, Ip) caused by the FAP 120-A is above a threshold value. In one embodiment, the interference management logic 408 may determine a power adjustment value (Padj), which may be used to reduce the transmit power value [Pt(FAP)] of the FAP 120-A causing strong interference. In one embodiment, reducing the transmit power value [Pt(FAP)] of the FAP causing strong interference based on the power adjustment value (Padj) may in turn reduce the interference value to a level below the threshold value. In one embodiment, the MS 400 may send the identifier (FAP ID) of the FAP causing strong interference and the power adjustment value (Padj) to the serving MBS 140.

In one embodiment, the MS 400 may send a signal either to disassociate from the serving MBS 140 or to continue communicating via the serving MBS 140 in response to a decrease in the transmit power value from the FAP causing strong interference.

Figure 5:
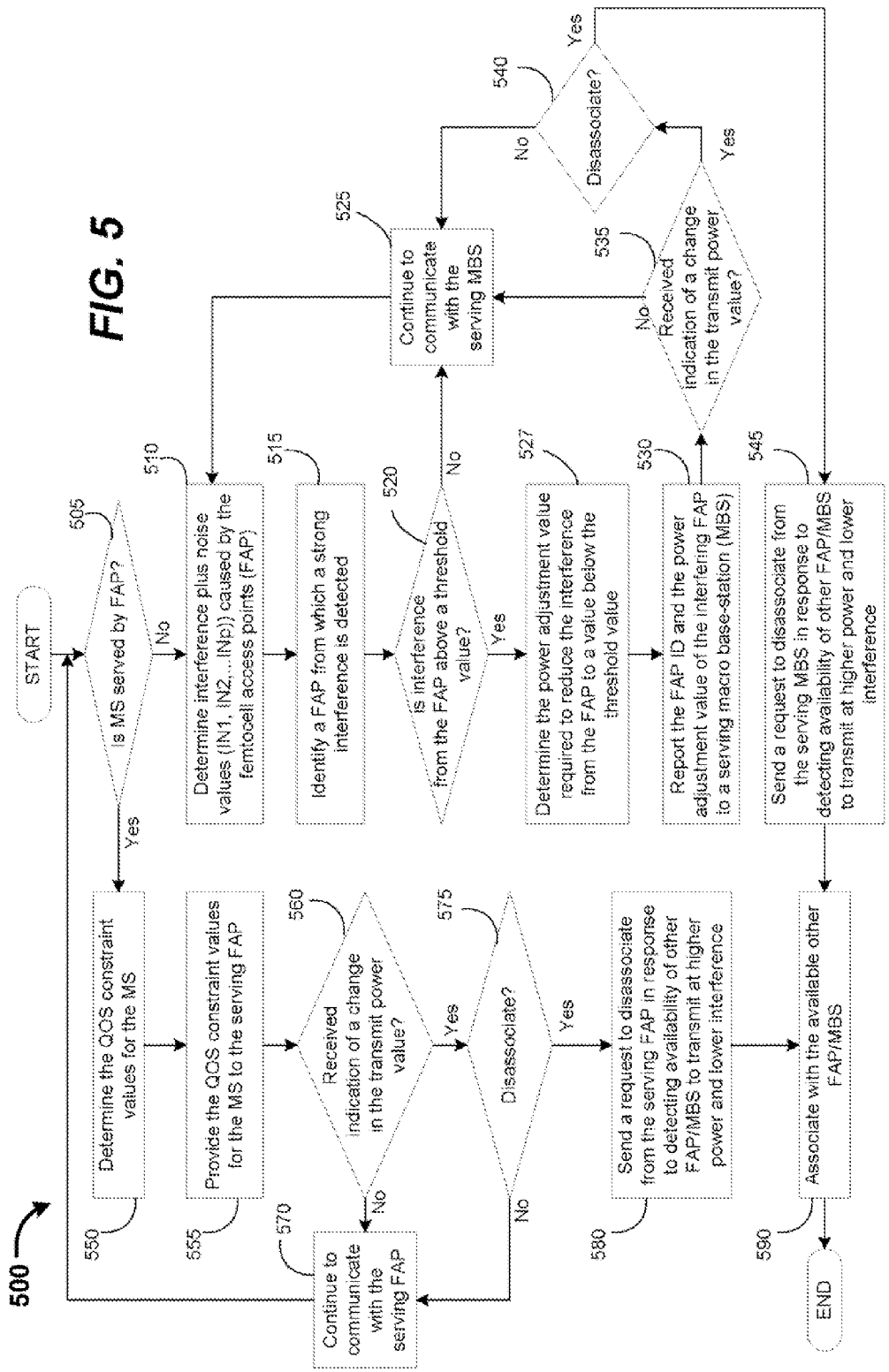
FIG. 5 is a flow-chart 500, which may illustrate the operation of the mobile node to support power control techniques applied at the FAP in accordance with one embodiment.

An embodiment of an operation of the MS 400 that may support power control techniques performed at the FAP is illustrated in flow-chart of FIG. 5. In block 505, the controller 405 may determine if the mobile station MS 400 is served by one of the FAPs or the MBS and then may provide control to the interference management logic 408. In one embodiment, the controller 405 may include a first value (for example, logic one) if the MS 400 is served by a FAP or a second value (for example, logic zero) if the MS 400 is served by the MBS into a handover signal sent to the interference management logic 408.

In block 510, the interference management logic 408 may determine interference values (I1, I2, I3, . . . Ip) representing interferences caused by one or more FAPs on the macro user MS 400, which is served by the MBS 140 in response to receiving a logic zero in the handover signal.

In block 515, the interference management logic 408 may identify a FAP, which may cause a maximum or strong interference. In block 520, the interference management logic 408 may determine if the interference value (for example, Ip caused by the FAP 120-A) corresponding to the FAP causing maximum or strong interference is above a threshold value. Control passes to block 525 if the interference value (for example, Ip caused by the FAP 120-A) is below the threshold and to block 527 if the interference value (for example, Ip caused by the FAP 120-A) is above the threshold value.

In block 525, the interference management logic 408 may allow the MS 400 to continue to communicate or to be served by the MBS such as MBS 140. In block 527, the interference management logic 408 may determine a power adjustment value (Padj), which may be used to reduce the transmit power value [Pt(FAP)] of the FAP such as the FAP 120-A causing a strong interference on the macro-user such as the MS 108-A. In one embodiment, reducing the transmit power value [Pt (FAP)] of the FAP causing strong interference based on the power adjustment value (Padj) may in turn reduce the interference value to a level below the threshold value.

In block 530, the interference management logic 408 may send an identifier (FAP ID) of the FAP causing strong interference on the macro-user(s) and the power adjustment value (Padj) to the serving MBS 140. In one embodiment, the serving MBS 140 may communicate the power adjustment value (Padj) to the serving FAP 120-A over a backbone or over the air (OTA).

In block 535, the interference management logic 408 may check if a signal indicating change of transmit power value is received and control passes to block 525 if the signal indicating change of transmit power value is not received and to block 540 if the signal indicating change of transmit power value is received.

In block 540, the interference management logic 408 may determine whether to disassociate from the serving MBS 140 and control passes to block 525 if the interference management logic 408 determines not to disassociate from the MBS 140 and to block 545 if the interference management logic 408 determines to disassociate from the MBS 140.

In block 545, the interference management logic 408 may send a signal to disassociate from the serving MBS 140 in response to determining that other FAP or MBS is available to serve the MS 400 with a higher transmit power and lower interference.

In block 550, the interference management logic 408 may determine the QoS constraint values such as signal to interference plus noise ratio (SINR) measurements for the MS 400, which may be served by the FAP in response to receiving a logic one in the handover signal. In block 555, the interference management logic 408 may provide the QoS constraint values to the serving FAP such as the FAP 120-A.

In block 560, the interference management logic 408 may check if a signal indicating change of transmit power value is received and control passes to block 570 if the signal indicating change of transmit power value is not received and to block 575 if the signal indicating change of transmit power value is received. In block 570, the interference management logic 408 may allow the MS 400 to continue to communicate or to be served by the FAP such as the FAP 120-A.

In block 575, the interference management logic 408 may determine whether to disassociate from the serving FAP 120-A and control passes to block 570 if the interference management logic 408 determines not to disassociate from the FAP 120-A and to block 580 if the interference management logic 408 determines to disassociate from the FAP 120-A.

In block 580, the interference management logic 408 may send a signal to disassociate from the serving FAP 120-A in response to determining that other FAP or MBS is available to serve the MS 400 with a higher transmit power and lower interference. In block 590, the interference management logic 408 may allow the MS 400 to associate with or to be served by the other available FAP/MBS with better signal quality and lower interference.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to mitigate interference in a multi-tier cellular network, comprising:
   controlling downlink power level at a plurality of second devices to mitigate interference caused by the plurality of second devices on a plurality of first mobile stations served by a plurality of first devices, and
   maintaining a quality of a service level provided to a plurality of second mobile stations served by the plurality of second devices and the plurality of first mobile stations served by the plurality of first devices,
   wherein a first network includes the plurality of first devices and the plurality of first mobile stations and a second network includes the plurality of second devices and the plurality of second mobile stations,
   wherein the multi-tier cellular network includes the first network and the second network and the second network is overlaid on the first network.

2. The method of claim 1 includes transmitting signals from the plurality of second devices at a fixed power level if the plurality of first devices and the plurality of second devices transmit over different carrier frequencies.

3. The method of claim 2 includes determining a value representing the fixed power level based on a density of the plurality of second devices provided in the second network.

4. The method of claim 3, wherein the value representing the fixed power level is less than a maximum power value provided for the plurality of second devices.

5. The method of claim 1 comprises:
   identifying a mobile station of the plurality of second mobile stations served by one of the plurality of second devices that has a weakest quality of service value, and
   adjusting power level of a signal transmitted by the one of the plurality of second devices that is serving the mobile station having the weakest quality of service value,
   wherein the power level of the signal transmitted by the plurality of second devices is adjusted if the plurality of first devices and the plurality of second devices transmit over a same carrier frequency,
   wherein adjusting the power level of the signal transmitted by the plurality of second devices is to maintain the quality of service level of the plurality of second mobile stations.

6. The method of claim 5 comprises:
   receiving a request to disassociate from the plurality of second devices in response to adjusting power level of the signal transmitted by the plurality of second devices, and
   discontinuing to serve one or more of the plurality of the second mobile stations from which the request to disassociate is received.

7. The method of claim 1 comprises:
   receiving a power adjustment value from one or more of the plurality of first devices; and
   changing the power level of a signal transmitted by the plurality of second devices based on the power adjustment value,
   wherein changing the power level of the signal transmitted by the plurality of second devices based on the power adjustment value is to maintain the quality of service level of the plurality of first mobile stations.

8. The method of claim 7 comprises:
   receiving a request to disassociate from the plurality of second devices in response to changing the power level of the signal transmitted by the plurality of second devices based on the power adjustment value, and
   discontinuing to serve the plurality of second mobile stations from which the request to disassociate is received.

9. A femto access point device provisioned in a multi-cellular network, comprising:
   an interface,
   a control unit coupled to the interface, wherein the control unit is to send a selection signal, and
   a power management unit coupled to the interface and the control unit, wherein the power management unit is to control downlink power level of a signal transmitted by the femto access point, wherein controlling the downlink power level of the signal transmitted by the femto access point is to mitigate interference caused by the femto access point on a plurality of first mobile stations served by a plurality of macro devices while maintaining a quality of a service level provided to a plurality of second mobile stations served by the femto access point, wherein a plurality of second devices includes the femto access point,
   wherein a first network includes the plurality of macro devices and the plurality of first mobile stations and a second network includes the plurality of second devices and the plurality of second mobile stations, wherein the multi-tier cellular network includes the first network and the second network and the second network is overlaid on the first network.

10. The femto access point of claim 9, wherein the power management unit is to enable the femto access point to transmit signals at a fixed power level if the plurality of second devices and the plurality of macro devices transmit over different carrier frequencies.

11. The femto access point of claim 10, wherein the power management logic is to determine a value representing the fixed power level based on a density of the plurality of second devices provided in the second network.

12. The femto access point of claim 11, wherein the power management logic is to determine the value representing the fixed power level to be less than a maximum power value provided for the plurality of second devices.

13. The femto access point of claim 9, wherein the power management logic is to,
  identify a mobile station of the plurality of second mobile stations served by the femto access point that has a weakest quality of service value, and
  change power level of a signal transmitted by the femto access point to ensure that the mobile station with the weakest quality of service value satisfies a minimum quality of service constraint,
  wherein the power level of the signal transmitted by the femto access point is changed if the plurality of macro devices and the plurality of second devices transmit over a same carrier frequency,
  wherein changing the power level of the signal transmitted by the femto access point is to maintain the quality of service level of the plurality of second mobile stations.

14. The femto access point of claim 13, wherein the control unit is to:
  receive a request to disassociate from the femto access point in response to changing the power level of the signal transmitted by the plurality of second devices, and
  discontinue to serve one or more of the plurality of the second mobile stations from which the request to disassociate is received.

15. The femto access point of claim 9, wherein the control unit is to:
  receive a power adjustment value from one or more of the plurality of macro devices; and
  change the power level of a signal transmitted by the plurality of second devices based on the power adjustment value,
  wherein changing the power level of the signal transmitted by the plurality of second devices based on the power adjustment value is to maintain the quality of service level of the plurality of first mobile stations.

16. The femto access point of claim 15, wherein the control unit is to:
  receive a request to disassociate from the femto access point in response to changing the power level of the signal transmitted by the plurality of second devices based on the power adjustment value, and
  discontinue to serve the plurality of the second mobile stations from which the request to disassociate is received.

* * * * *